Sept. 11, 1951     H. S. ALEXANDER     2,567,502
VISION TARGET ASSEMBLY FOR TELEBINOCULAR INSTRUMENTS
Original Filed Oct. 16, 1948
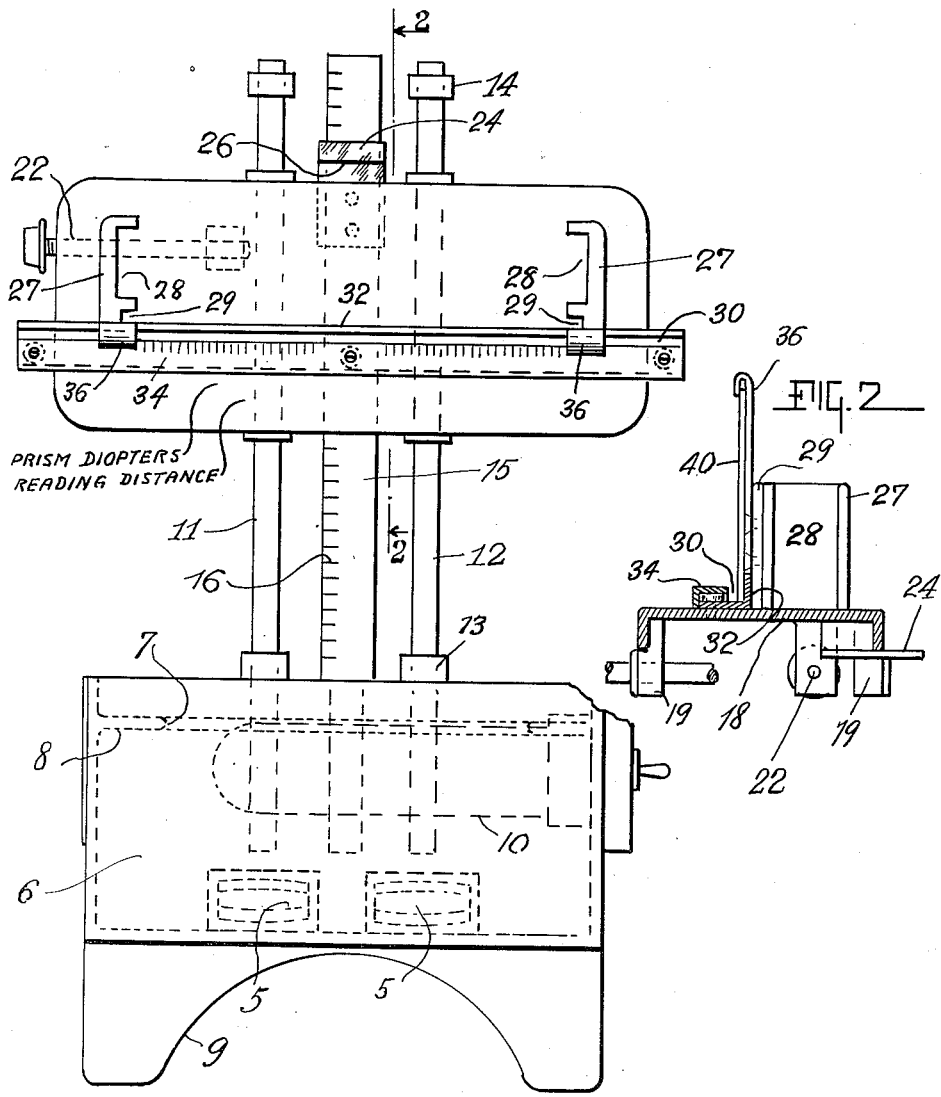
Harry S. Alexander
INVENTOR.
BY Ivan C. A. Konigsberg Patented Sept. 11, 1951

2,567,502

UNITED STATES PATENT OFFICE

2,567,502

VISION TARGET ASSEMBLY FOR TELEBINOCULAR INSTRUMENTS

Harry S. Alexander, Meadville, Pa., assignor to Keystone View Company, Meadville, Pa., a corporation of Pennsylvania Original application October 16, 1948, Serial No. 54,965, now Patent No. 2,491,242, dated December 13, 1949. Divided and this application November 16, 1949, Serial No. 127,685

1 Claim. (Cl. 88—20)

The object of this invention is to provide an improved vision target assembly unit for use with telebinocular instruments of the type disclosed in my pending allowed application Serial Number 54,965, filed October 16, 1948, Patent No. 2,491,242, December 13, 1949, of which this application is a division. The unit may also be used with other types of stereoscopic instruments. Such instruments use cards or slides with pictorial representations suitable for testing and training binocular vision ability. It is an object of this invention to provide an improved unit in the form of a box or magazine adapted to contain and present cards or slides in position to be used with the instruments. The unit is arranged to be removably attached to the instrument.

In the accompanying drawing illustrating the invention Fig. 1 is a plan view of the card assembly unit mounted upon a telebinocular instrument. Fig. 2 is a sectional view of the unit taken on the line 2—2 of Fig. 1.

The instrument referred to comprises a stand upon which is mounted an optical lens assembly for viewing the cards or slides. Two supporting rods extend from the lens assembly and serve to support an ortho trainer unit or a vision target assembly unit. The latter forms the subject matter of this application. Only so much of the telebinocular instrument is shown in the drawing as is necesary for understanding this invention. Fig. 1 shows the optical lens assembly of the instrument.

A fixed optical lens system consisting of a pair of lenses 5, 5 is mounted within a housing 6 and so arranged that infinity is about 200 millimeter distance from the lenses and the reading distance is about 131 millimeter. The housing has an opening 7 in the rear wall 8 and in front there is formed a head rest 9 for the subject. A lamp 10 is shown. The light from the lamp shines or is directed towards the cards or targets to be used. The housing 6 is supported upon a stand below the housing. The stand is not shown.

From the housing 6 along the line of view extend two rods 11, 12 upon which are placed adjustable near stops 13 and far stops 14, respectively. The stops may be simple sleeves which detachably and frictionally engage the rods. Also extending from the housing is a longitudinal scale member 15 with a diopter scale 16 thereon.

The card assembly unit comprises a base 18 with bearings 19, 19 for mounting the unit upon the rods 11, 12, the far stops 14 being first removed. The rods pass through the bearings so that the card unit may be manually moved along the rods to vary the distance from the lenses. The card unit may be fixed in any position upon the rods by means of a screw 22 which is brought to bear against the rod 11. At the rear side of the base 18 (away from the lenses) there is affixed a transparent plate 24 having a line mark 26 for registry with the diopter scale 16.

The base has two upstanding brackets 27, 27 with recesses 28 to form a card magazine or card box adapted to contain test cards, not shown. The brackets 27 are formed with forward single grooves 29, 29 in which a single card is placed for testing purposes. If the technician desires to use split cards, the two halves of such split card are placed in a groove 30 which extends across the line of view. This groove is formed between an upright flange 32 and a scale member 34 secured to the base. The two parts of the split card are held in position by upright curved hook members 36. A card is shown at 40. The graduations on the scale member 34 are marked in diopters for infinity and near point reading as indicated. The spacing of the scale indicia on the drawing are not the actual measurements. Other training cards may be placed in the groove 30 and the distance between such cards and the lenses is set to suit the requirement of the subject.

The card assembly is a complete unit adapted to be attached and mounted upon the instrument and positioned thereon without the use of any tools. It is easily removed and adjusted to suit various types of binocular vision tests.

I claim:

In combination with a telebinocular instrument of the character described having a pair of viewing lenses and two parallel rods with a scale member therebetween extending rearwardly from said lenses along the line of view, a detachable unit for supporting binocular vision test cards upon said instrument comprising a base slidably supported upon the said rods, means on the base for securing said unit in adjusted positions on said rods, two upstanding bracket members on said base forming a magazine between them for holding a pack of binocular vision test cards, each of said members having a single vertical groove in front of said magazine for supporting a single card from said pack of cards, means in said unit for removably supporting a pair of duplicate views in front of said magazine comprising transverse members on said base forming a single bottom groove, two upright view holders secured to said upstanding bracket members and having downwardly directed flanges cooperating with said single bottom groove to support the said pair of views, one of said groove members bearing a transverse scale and a transparent plate secured on said base and having a line mark thereon for register with the said instrument scale member between the said rods.

HARRY S. ALEXANDER.

REFERENCES CITED

The following references are of record in the file of this patent:

UNITED STATES PATENTS

| Number | Name | Date |
|---|---|---|
| 984,055 | White | Feb. 14, 1911 |
| 1,543,188 | Poser | June 23, 1925 |
| 2,070,849 | Sherman | Feb. 16, 1937 |
| 2,166,063 | Krimsky | July 11, 1939 |
| 2,422,384 | Alexander | June 17, 1947 |